United States Patent [19]
Berman et al.

[11] Patent Number: 5,156,700
[45] Date of Patent: Oct. 20, 1992

[54] METHOD AND APPARATUS FOR MAKING THREE-DIMENSIONAL OBJECTS

[75] Inventors: Michael Berman; Orit Kazav, both of Kfar Yona, Israel

[73] Assignee: NCT, Ltd., Givatany, Israel

[21] Appl. No.: 726,667

[22] Filed: Jul. 8, 1991

[30] Foreign Application Priority Data

Jul. 13, 1990 [IL] Israel .......................................... 95077

[51] Int. Cl.$^5$ ......................... B32B 31/00; G06G 7/64
[52] U.S. Cl. .................................... 156/155; 156/196;
156/275.5; 156/245; 156/250; 156/353;
156/356; 156/379.8; 364/474.24
[58] Field of Search ..................... 156/155, 58, 59, 62,
156/62.2, 196, 219, 220, 252, 272.2, 275.5, 250,
516, 529, 245, 350, 353, 356, 379.8; 264/138,
163, 227, 241, 294; 364/474.24, 468, 469, 477

[56] References Cited

U.S. PATENT DOCUMENTS

| | | | |
|---|---|---|---|
| 4,056,596 | 11/1977 | Pahl | 156/155 X |
| 4,614,555 | 9/1986 | Smith et al. | 156/353 X |
| 4,961,154 | 10/1990 | Pomerantz et al. | 264/22 X |
| 5,031,120 | 7/1991 | Pomerantz et al. | 364/474.24 X |
| 5,071,503 | 12/1991 | Berman | 156/250 |

Primary Examiner—David A. Simmons
Assistant Examiner—Chester T. Barry
Attorney, Agent, or Firm—Benjamin J. Barish

[57] ABSTRACT

A method and apparatus for making a three-dimensional object including a large number of layers bonded together each having the contour of a thin slice of the object, are characterized in that each layer of the object is formed over its preceding layer by: applying a layer of a supporting material to the preceding layer; sculpture machining the supporting material layer according to the negative underface contour of the respective layer of the object to be formed; applying a layer of the object material in flowable form over the supporting material layer such that the underface of the object material layer takes the shape of the positive contour of the respective layer of the object to be formed; hardening the object material layer; and sculpture machining the upper face of the object material layer according to the positive upperface contour of the respective layer of the object to be formed.

20 Claims, 5 Drawing Sheets

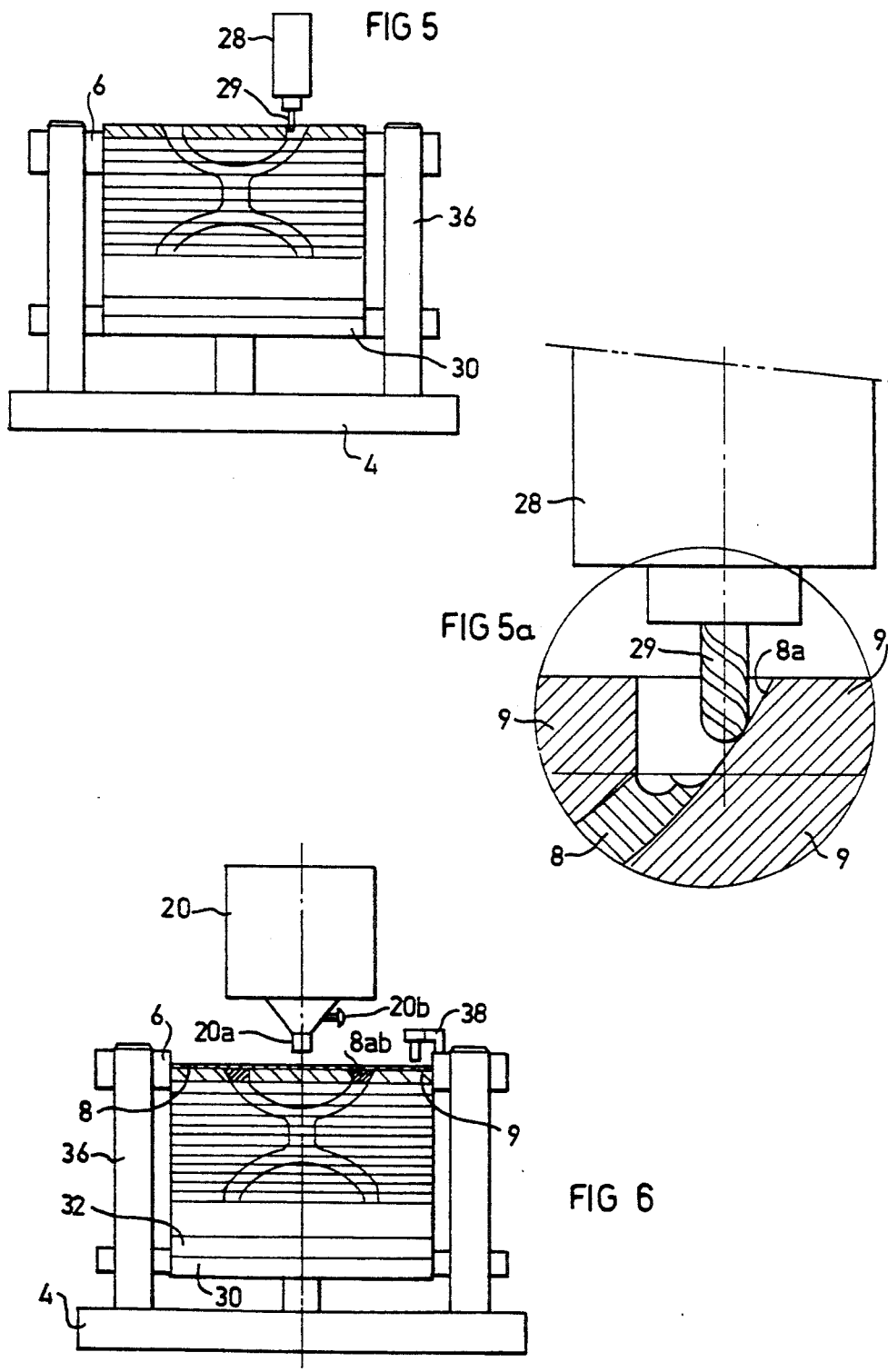

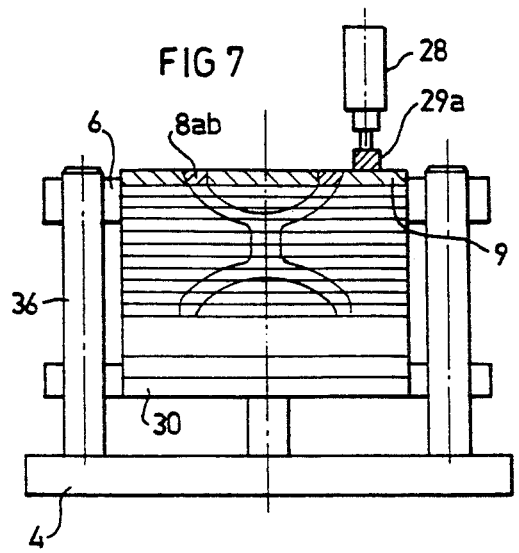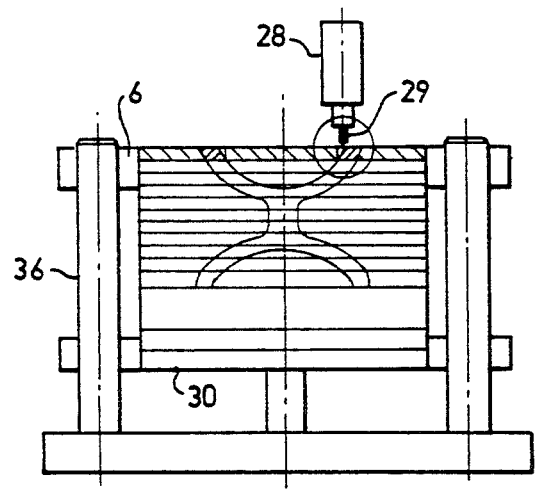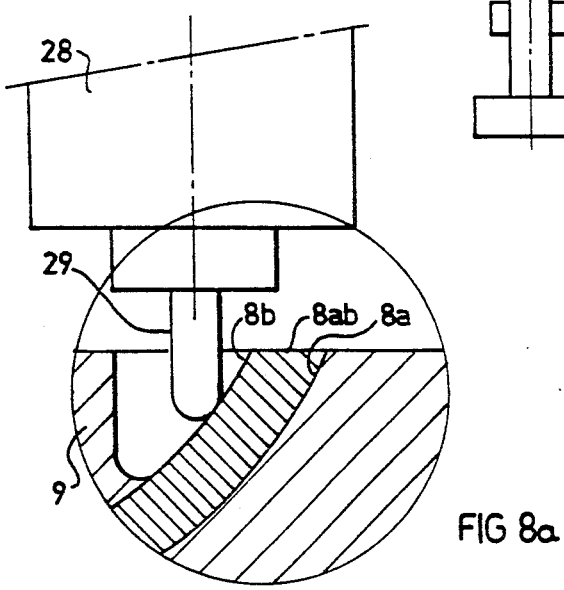

METHOD AND APPARATUS FOR MAKING THREE-DIMENSIONAL OBJECTS

RELATED APPLICATION

The present application is related to pending application Ser. No. 07/422,273, filed Oct. 16, 1989, now U.S. Pat. No. 5,071,503, and assigned to the same assignee as the present application.

FIELD AND BACKGROUND OF THE INVENTION

The present invention relates to a method and apparatus for making three-dimensional objects, such as models, dies, moulds, and other three-dimensional articles. The invention is particularly applicable to the overall techniques described in copending application Ser. No. 07/422,273 filed Oct. 16, 1989, now U.S. Pat. No. 5,071,503.

Patent application Ser. No. 07/422,273 discloses a method and apparatus for making a three-dimensional object constituted of a large number of layers bonded together each having the contour of a thin slice of the object, characterized in that each layer is bonded to its preceding layer and is precisely contoured after having been so bonded but before the next succeeding layer is bonded to it. In one embodiment of the invention therein described, each layer is applied to the preceding layer by photopolymerization, and its contour is precisely cut by a cutting operation before the next succeeding layer is applied.

Such a method provides a number of advantages, compared to the previously-known methods of making three-dimensional objects, including: avoidance of errors stemming from registration problems, thickness of the adhesive, etc.; capability of obtaining a high degree of precision; and adaptability to CAD (computer-aided-design) and CAM (computer-aided-manufacture) techniques.

OBJECTS AND BRIEF SUMMARY OF THE INVENTION

An object of the present invention is to provide a novel method and apparatus for making a three-dimensional object offering the same advantages as described above, but also capable of being implemented in a less expensive system than that described in the above patent application. A further object is to provide a method and apparatus capable of producing homogeneous objects with higher accuracy, and of a variety of materials including wax. Another object of the invention is to provide a novel method and apparatus capable of precisely making objects with intricate geometries, e.g., a gently inclined thin membrane or slot.

According to the present invention, there is provided a method of making a three-dimensional object including a large number of layers bonded together each having the contour of a thin slice of the object, characterized in that each layer of the object is formed over its preceding layer by: applying a layer of a supporting material to the preceding layer; sculpture machining by a cutting implement the supporting material layer according to the negative underface contour of the respective layer of the object to be formed; applying a layer of the object material in flowable form over the supporting material layer such that the underface of the object material layer takes the shape of the positive contour of the respective layer of the object to be formed; hardening the object material layer; and sculpture machining by a cutting implement the upper face of the object material layer according to the positive upperface contour of the respective layer of the object to be formed.

Each layer is thus moulded onto the previous layer after the previous layer was precisely machined, thereby achieving both the necessary bonding of each layer and the precise contouring of both its upper and lower surfaces.

After all the layers of the supporting material and object material have been applied for forming the three-dimensional object, all the supporting material layers may be easily removed to leave only the object material layers bonded together defining the three-dimensional object. Where wax is used for the supporting material layers, it may be easily removed by melting.

According to a further feature in the preferred embodiment of the invention described below, the object material layer is hardened by photopolymerization. The supporting material layer is also applied in liquid form but is hardened by cooling before it is machined. Each new object material layer preferably has a thickness somewhat larger than the intended thickness of the respective layer of the object being made, whereupon the upper surface of the object and supporting material layer is planed flat to the required thickness after it has been hardened and before (and/or after) it is sculpture machined.

The invention also provides apparatus for making a three-dimensional object in accordance with the above method.

It will thus be seen that the novel method and apparatus for making three-dimensional objects have a capability of high precision, avoid errors stemming from variations in the thickness of layers or in the use of adhesives for bonding the layers together, and are well suited for CAD and CAM techniques. In addition, the machining of both the supporting material layers and the object material layers may be effected by a machine tool having freedom of movement in only three axes (the three orthogonal axes), and does not require freedom of movement in four or five axes to attain high precision, thereby enabling the method to be implemented with relatively inexpensive machining apparatus.

Further features and advantages of the invention will be apparent from the description below.

BRIEF DESCRIPTION OF THE DRAWINGS

The invention is herein described, by way of example only, with reference to the accompanying drawings, wherein:

FIG. 5 illustrates the apparatus while machining the applied supporting material layer, FIG. 5a being an enlarged fragmentary view of FIG. 5;

FIG. 6 illustrates the apparatus after applying the object material layer in the respective slice of the object to be formed;

FIG. 7 illustrates the apparatus while planing the respective object material layer;

FIG. 8 illustrates the apparatus while machining the applied object material layer, FIG. 8a being an enlarged fragmentary view of FIG. 8.

DESCRIPTION OF A PREFERRED EMBODIMENT

Figure 2:
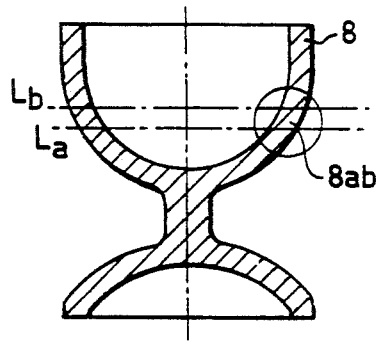
FIG. 2 illustrates an example of a three-dimensional object that may be constructed with the apparatus of FIG. 1, FIG. 2a being an enlarged fragmentary view of FIG. 2.

The apparatus illustrated in the drawings comprises a base, generally designated 2, supporting a carriage 4, which in turn supports a square frame 6 vertically movable with respect to the carriage and used in building-up the three-dimensional object, generally designated 8, to be constructed by the apparatus. FIG. 2 illustrates an example of such an object 8 produced by the apparatus. As will be described more particularly below, object 8 is produced by bonding together a large number of layers each having the contour of a thin slice of the final configuration of the object.

Figure 1:
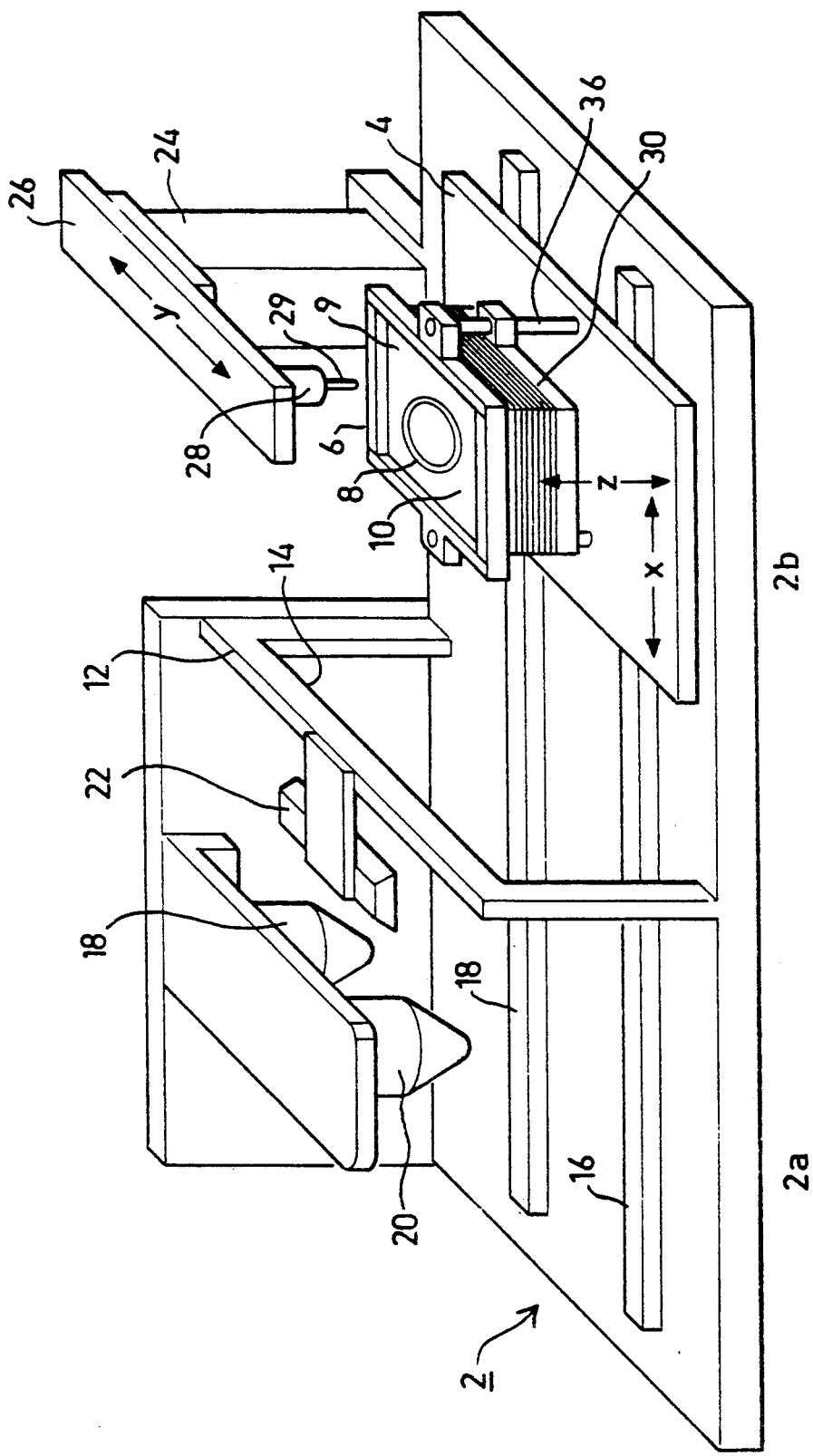
FIG. 1 is a three-dimensional view illustrating one form of apparatus constructed in accordance with the present invention.

FIG. 2 illustrates one configuration of the three-dimensional object 8 to be produced and one such layer 8ab in the manufacture of the object 8. As shown particularly in FIG. 2b, the respective layer or slice 8ab of the object 8 includes a lower surface 8a and an upper surface 8b, both of which surfaces are formed according to the desired contour as will be described more particularly below. As will also be described below, the illustrated apparatus produces a composite assembly, generally designated 10 in FIG. 1, within frame 6, which assembly includes the three-dimensional object 8 occupying a part of the space within frame 6, and supporting material 9 (e.g., wax) occupying the remaining space within the frame.

Base 2 of the apparatus is divided into two sections 2a, 2b. These sections may have separate enclosures (not shown) to define separate housings or compartments on opposite sides of a partition wall 12 formed with a large rectangular opening 14. Carriage 4, supporting the vertically-movable frame 6 and the composite assembly 10 produced within the frame, is movable along the X-axis by guides 16 through opening 14 to either section 2a or section 2b of the base 2.

Section 2a of base 2 supports a pair of material applicators 18, 20, and also an ultraviolet radiation device 22. Applicator 18 contains a supply of the supporting material 9 used in making the composite assembly 10 and is located so as to overlie one side of frame 6 when carriage 4 is within section 2a of the base 2. In the case of wax, the supporting material is maintained at its melting temperature by a heating element controlled by a thermostat. Applicator 20 contains a supply of photopolymerizable object material and is aligned with the opposite side of frame 6 when the carriage is in section 2a. Radiation unit 22 extends across the complete width of the frame 6 so as to radiate the complete layer of object material applied by applicator 20 as the carriage moves from base section 2a to base section 2b of the base.

Section 2b of base 2 includes a fixed column 24 supporting a second carriage 26 movable along the Y-axis. Carriage 26 carries a machining device including a spindle 28 and a cutting tool 29 overlying the frame 6 on carriage 4 when the carriage is in base section 2b.

Figure 3:
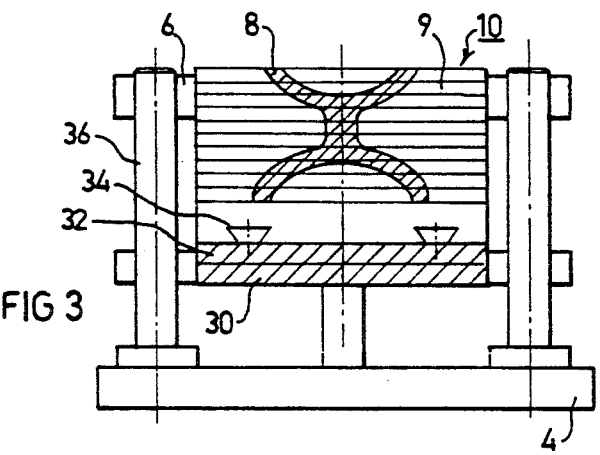
FIG. 3 illustrates a portion of the apparatus of FIG. 1 at an intermediate stage in producing the object illustrated in FIG. 2.

As shown particularly in FIG. 3, carriage 4 further supports an elevator platform 30 of the same outer configuration and dimensions as the inner face of the square frame 6. Platform 30 in turn supports a plate 32 of the same configuration as the platform. To the upper surface of plate 32 are fixed a plurality of metal coned pins 34 having their larger diameters facing upwardly.

The square frame 6 is fixedly supported at its four corners by four guide posts 36, and at a height above carriage 4 greater than the height of the object 8 to be produced by the apparatus. Elevator platform 30, together with plate 32 and its coned pins 34, is movably mounted by the guide posts 36 and is driven by a platform drive $M_Z$ (FIG. 9) from an upper position substantially aligned with the square frame 6, to a lower position just above carriage 4.

The cutting tool 29 may thus be located anywhere within the space enclosed by frame 6 by controlling the drive ($M_X$, FIG. 9) for the carriage 4, the drive $M_Y$ for carriage 26, and the drive $M_Z$ for the elevator platform 30.

Figure 9:
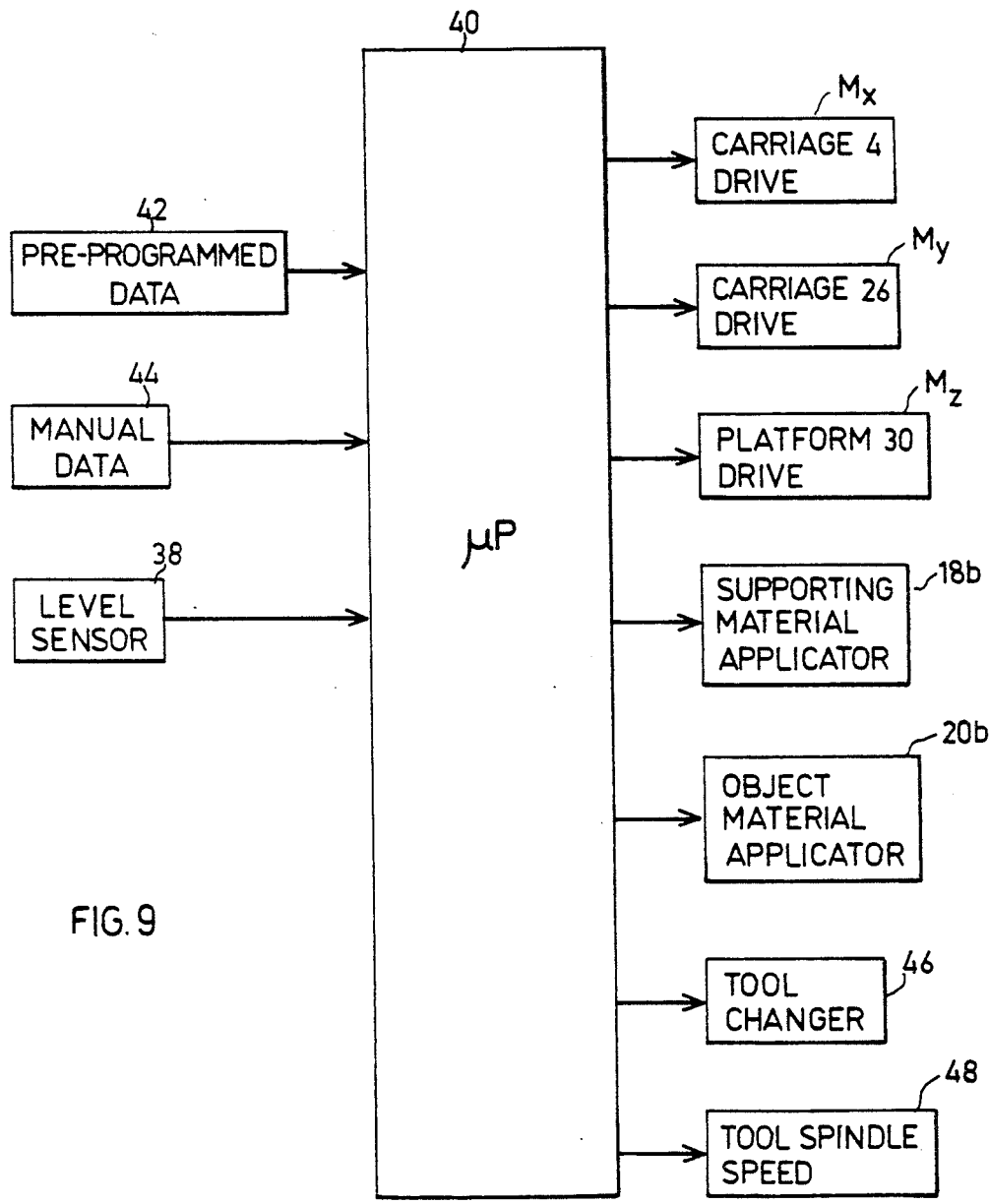
FIG. 9 schematically illustrates the control system for controlling the apparatus of FIGS. 1-8.

At the start of the manufacturing operation, platform 30 is at its upper position, wherein the upper surface of its plate 32 is just below the upper surface of frame 6, at which time the first layer of supporting materials is applied in producing the composite assembly 10. The platform is then moved down one step at a time, each step corresponding to the thickness of the respective layer to be formed in the respective stage of the process, until the complete composite assembly 10 is produced, whereupon the platform is in its lowermost position. The platform is driven by a motor $M_Z$, as shown in FIG. 9.

Figure 4:
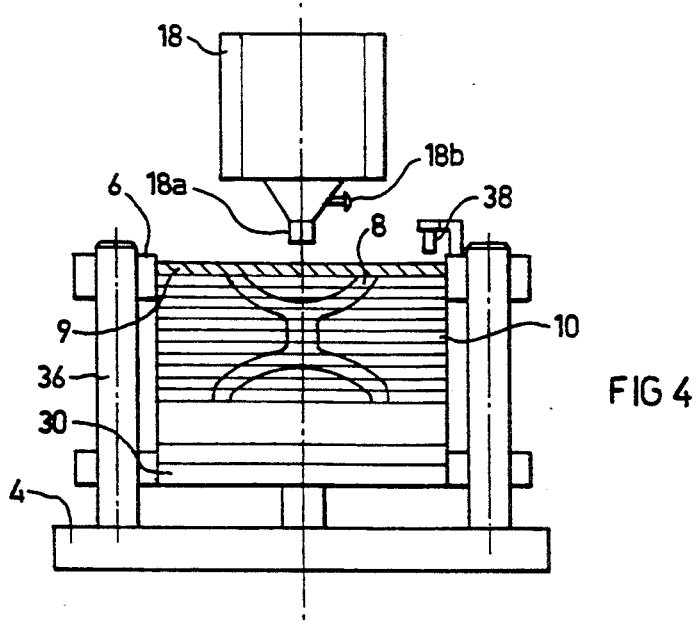
FIG. 4 illustrates the apparatus after applying a supporting material layer for producing the next slice of the object.

The square frame 6 further includes a liquid-level sensor 38, as shown in FIG. 4, for controlling the level of the liquid as applied by both the supporting material applicator 18, and the object material applicator 20. As more particularly illustrated in FIG. 4, the supporting material is applied from applicator 18 via its nozzle 18a for the desired thickness of the respective layer, as determined by level sensor 38, the latter controlling tap 18b of the applicator. Applicator 20 for the object material similarly includes a nozzle 20a and a cap 20b (FIG. 6), the latter also being controlled by the liquid level sensor 38.

In general, each layer is applied to a predetermined thickness, e.g., 2-5 mm, unless that particular layer would produce a downwardly pointing surface casting a shadow on an upwardly pointing surface in the respective layer, as pre-programmed according to the contour for the respective layer of the object to be formed. If the particular layer does involve such a downwardly pointing surface casting a shadow on an upwardly pointing surface within the respective layer, then the computer automatically decreases the thickness of the respective layer until this condition is no longer present, or to a minimum preset thickness, e.g., 0.1 mm. In general, the object material is applied to a slightly greater thickness than the thickness for the respective layer in the object to be performed, and is machined flat to the precise thickness by a planing tool 29a (FIG. 7) before and/or after the layer of the object material has been machined.

The machining device may include a tool magazine (not shown) and a tool change mechanism for selecting different types or diameters of cutting tools to be applied to spindle 28; alternatively, the machining device could include a plurality of spindles 28 each equipped with a cutting tool of one type and selectively controlled according to the particular machining operation to be performed. One of the cutting tools, however, is preferably the previously-mentioned planing tool 29a, FIG. 7, to plane flat the object material for the respective layer before and/or after it has been machined according to the configuration of the object in the respective layer.

The overall control system for the apparatus is schematically illustrated in the block diagram of FIG. 9. The control system includes a microprocessor 40 having a pre-programmed input 42 in which the various machine controls are pre-programmed according to the object to be produced. Microprocessor 40 further includes a manual input 44 enabling manual data or controls to be inputted into the microprocessor. The control system further includes an input from the liquid level sensor 38.

Microprocessor 40 produces outputs to motor $M_X$ for driving carriage 4, motor $M_Y$ for driving carriage 26, and motor $M_Z$ for driving the platform 30 on which the composite assembly 10 is formed. Microprocessor 40 further outputs control signals to the tap 18b for the supporting material applicator 18, and tap 20b for the object material applicator 20. The microprocessor 40 also controls the tool changer for changing tools 29 on the spindle 28, as shown by block 46 in FIG. 9, and the tool spindle speed as shown by block 48.

The apparatus illustrated in the drawings operates as follows:

At the start of the production of a three-dimensional object, whose contour has been pre-programmed by input unit 42 into the microprocessor 40, platform 30 (FIG. 3), on which the composite assembly 10 is formed, is in its highest position. In this position, its coned pins 34 are slightly below the upper surface of square frame 6.

Carriage 4 is then driven into base section 2a to underlie applicator 18 containing a supply of the supporting material, e.g., heated wax. At this time, tap 18b (FIG. 4) of applicator 18 is opened to permit the molten supporting material to flow onto plate 32 (FIG. 3) until it completely embeds the coned pins 34. The coned pins thus serve to anchor the next and subsequent layers of supporting material 9 and object material 8 as these layers are applied and machined to produce the overall composite assembly 10 as shown in FIG. 3. After the composite assembly 10 has been so produced, the supporting material 9 is removed, as by melting, thereby leaving only the three-dimensional object 8 of the desired configuration.

FIGS. 4-8 more particularly illustrate how each layer of supporting material 9 and object material 8 is applied and machined in order to produce the desired contour in the respective slice of the three-dimensional object produced by the apparatus.

Thus, as shown in FIG. 4, the respective layer of the supporting material 9 is applied from its applicator 18 to the desired thickness, as controlled by the level sensor 38. After the supporting material has been applied to the required thickness, carriage 4 is actuated to move frame 6, and the platform 30 within the frame, to base section 2b of the apparatus to underlie the cutting tool 29. When heated wax is used for the supporting material, it usually solidifies sufficiently during its movement from section 2a to section 2b of the apparatus, but external cooling means may be provided for this purpose if desired.

Figure 2A:
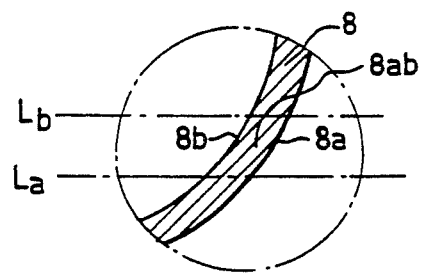

After the supporting material layer 9 has sufficiently hardened, it is machined by cutting tool 29 according to the negative contour of the respective layer of the object to be formed. This is more clearly illustrated in FIGS. 5 and 5a, wherein it will be seen that tool 29 cuts the respective layer of the supporting material 9 according to contour 8a (FIG. 2a) of the respective slice 8ab of object material. This contour is pre-programmed in the input unit 42, and microprocessor 40 controls the three drives $M_X$, $M_Y$, $M_Z$ to produce the contour specified by the pre-programmed data.

After contour 8a has been so formed by cutting tool 29, platform 30 (FIG. 3) is stepped down one increment, according to the thickness of the object material layer to be applied, and carriage 4 is driven back to base section 2a, for receiving a layer of the object material from applicator 20. The tap 20b of the applicator is controlled to produce the desired level of the object material namely until it covers the top of the supporting material layer by approximately 0.2–0.3 mm, thus making sure that all cavities premachined in the supporting material layer have been filled with object material. Since this object material is a photopolymerizable liquid, its underface takes the shape of the positive underface contour 8a of the respective layer, and is hardened as it moves under the radiation unit 22 during the movement of the carriage 4 back to base section 2b. The layer, consisting of both supporting material and object material, is then planed flat to the precise thickness for the respective slice of the object to be performed by planing tool 29a (FIG. 7). The upperface of the object material layer is then machined according to the positive contour 8b of the respective layer 8ab of the object to be performed, as shown in FIGS. 8 and 8a.

After that layer has been formed, the platform 30 is then stepped down one step from the square frame 6 by motor $M_Z$, and the procedure is repeated to form each succeeding layer until all the required layers of the composite assembly 10 are formed.

After all the layers of the composite assembly 10 are formed, the supporting material 9 is removed, as by melting, thereby leaving only the three-dimensional object 8.

As described earlier, the system selects the maximum thickness of layers, e.g., 2-5 mm, unless it violates the above-described rule that there must be no downwardly pointing surface casting a shadow on an upwardly pointing surface and no horizontal plane surface within a single layer; in such case, the thickness of the layer is automatically reduced until the rule does not become violated. If, nevertheless, violation of the rule cannot be avoided (e.g., in the case of a screw), the software chooses a minimum thickness, e.g., 0.1 mm.

While the invention has been described with respect to one preferred embodiment, it will be appreciated that many variations may be made. For example, while the supporting material is described as being heat-meltable wax, which is hardened by cooling and removed by melting, it may be other materials, e.g., glue coated preformed sheets removed by selective dissolution. In addition, while the object material is described as being of a photopolymerizable liquid, it may also be another molten material, e.g., wax, plastic or metal, hardened by cooling (or some particle powder packed and bonded by pressure and heat). For example, the supporting material layer may be made of a photopolymerizable or heat polymerizable liquid, and the object material may be of a meltable wax. Further, while the planing operation is described as being applied to the object material before it has been machined, it may be applied after machining, or both before and after machining; and a similar machining operation may also be applied to the supporting material after it has been hardened and before and/or after it has been machined.

Many other variations, modifications and applications of the invention will be apparent.

What is claimed is:

1. A method of making a three-dimensional object including a large number of layers bonded together each having the contour of a thin slice of the object, characterized in that each layer of the object is formed over its preceding layer by:

applying a layer of a supporting material to the preceding layer;

sculpture machining by a cutting implement the supporting material layer according to the negative underface contour of the respective layer of the object to be formed;

applying a layer of the object material in flowable form over the supporting material layer such that the underface of the object material layer takes the shape of the positive contour of the respective layer of the object to be formed;

hardening the object material layer;

and sculpture machining by a cutting implement the upperface of the object material layer according to the positive upperface contour of the respective layer of the object to be formed.

2. The method according to claim 1, wherein said object material layer is hardened by photopolymerization.

3. The method according to claim 1, wherein said object material is hardened by cooling.

4. The method according to claim 1, wherein said supporting material layer is applied in liquid form and is hardened before it is machined.

5. The method according to claim 4, wherein said supporting material layer is hardened by cooling.

6. The method according to claim 4, wherein said supporting material is hardened by polymerization.

7. The method according to claim 1, wherein the upper surface of the object material layer is planed flat to the required thickness after it has hardened.

8. The method according to claim 1, wherein, after all the layers of the supporting material and object material have been applied for forming the three-dimensional object, all the supporting material layers are removed to leave only the object material layers bonded together to define the three-dimensional object.

9. The method according to claim 8, wherein all the supporting material layers are removed by melting.

10. The method according to claim 9, wherein all the supporting material layers are of wax.

11. The method according to claim 8, wherein all the supporting material layers are removed by selective dissolution.

12. Apparatus for making a three-dimensional object including a large number of layers bonded together each having the contour of a thin slice of the object, comprising:

a supporting member including a drive therefor for supporting the object to be made;

a first applicator for applying each supporting material layer to its preceding layer;

a second applicator for applying each object material layer in liquid form to its preceding layer;

a machining device including a cutting implement;

and control means for controlling the supporting member drive, the two applicators, and the machining device, to form each object material layer over its preceding layer by;

applying a supporting material layer to the preceding layer;

cutting the supporting material layer according to the negative underface contour of the respective layer of the object to be formed;

applying the object material layer in flowable form over the supporting material layer such that the underface of the object material layer takes the shape of the positive contour of the respective layer of the object to be formed;

and, after the object material layer has hardened, cutting the upper surface of the object material layer according to the positive upperface contour of the respective layer of the object to be formed.

13. The apparatus according to claim 12, wherein said supporting member includes a carriage and its drive drives the carriage along one orthogonal axis.

14. The apparatus according to claim 13, wherein said two applicators are located at one end of the path of travel of the carriage by said drive along said one orthogonal axis.

15. The apparatus according to claim 13, wherein said machining device is carried by a second carriage and includes a drive for driving the machining device along a second orthogonal axis in the plane of movement of the first carriage.

16. The apparatus according to claim 15, wherein said machining device includes a third drive for driving it along a third orthogonal axis towards and away from the plane of movement of the first carriage.

17. The apparatus according to claim 12, wherein said first applicator comprises a liquid reservoir for applying a layer of a photopolymerizable material in liquid form over the preceding layer, and a photo-energy producing means effective to polymerize said latter material to harden it.

18. The apparatus according to claim 12, wherein said second applicator comprises a second liquid reservoir for applying the supporting material layer in melted form over its preceding layer.

19. The apparatus according to claim 12, wherein said control means further includes a liquid level sensor for sensing, and for controlling in response thereto, the two applicators to apply their respective liquid layers according to a predetermined thickness.

20. The apparatus according to claim 12, wherein said machining device further includes a planing device controlled by said control means to plane each of said object material layers to a predetermined flat thickness after it has been applied and has hardened.

* * * * *